United States Patent
LaVeine

(10) Patent No.: US 7,438,187 B2
(45) Date of Patent: *Oct. 21, 2008

(54) FREE WIRE RECLAIMER WITH IMPROVED MAGNETIC SEPARATION

(75) Inventor: Andrew T. LaVeine, Newberg, OR (US)

(73) Assignee: Action Equipment Company, Inc., Newberg, OR (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/272,641

(22) Filed: Nov. 14, 2005

(65) Prior Publication Data

US 2006/0070922 A1    Apr. 6, 2006

Related U.S. Application Data

(63) Continuation-in-part of application No. 10/345,689, filed on Jan. 15, 2003, now Pat. No. 7,090,080.

(51) Int. Cl.
*B03C 1/30* (2006.01)
*B03C 1/00* (2006.01)

(52) U.S. Cl. .................... 209/38; 209/40; 209/225; 209/223.1

(58) Field of Classification Search .................. 209/38, 209/40, 223.1, 225, 226, 227, 231, 920, 821, 209/223.2

See application file for complete search history.

(56) References Cited

U.S. PATENT DOCUMENTS

| | | |
|---|---|---|
| 1,082,352 A | 12/1913 | Morrow |
| 1,208,880 A | 12/1916 | Wright et al. |
| 2,470,889 A | 5/1949 | Drescher |

(Continued)

OTHER PUBLICATIONS

Steinert Electromagenetbau Gmbh, "Separation" (catalog), date unknown, 10-pgs, Steinert Electromagnetbau Gmbh, Koln, Germany.

(Continued)

*Primary Examiner*—Patrick H Mackey
*Assistant Examiner*—Mark Hageman
(74) *Attorney, Agent, or Firm*—Chernoff, Vilhauer, McClung & Stenzel, LLP

(57) ABSTRACT

A magnetic separation apparatus for separating metallic material from a granulated stream of mixed metallic and nonmetallic material comprises a vibratory conveyor having a trough assembly mounted on a suspension system and coupled to a motor for causing the suspension system to vibrate. The trough assembly includes an upper trough having at least two sections aligned in a predetermined direction of material flow and a lower trough extending in the same direction as and beneath the upper. The upper trough includes one or more gaps of a predetermined width so as to permit material to fall onto the lower trough. Each trough is arranged so as to feed a different output collection point. At least one of the gaps between a downstream section of the upper trough and an upstream section of the upper trough includes the downstream section positioned at a height lower than the upstream section thereby forming a vertical drop between the two sections with the gap positioned therebetween. For each gap, an adjustable gate may be used for adjusting the width of the gap. A magnetic separator may be arranged above the gap in the upper trough so as to pick up free metal. Rubber granules fall through the gap and are deposited in a receptacle, while metal is deposited on the upper trough which feeds a separate receptacle. A declumping zone comprising at least one perforated deck may be situated in-line with the upper and lower troughs.

29 Claims, 11 Drawing Sheets

U.S. PATENT DOCUMENTS

| | | |
|---|---|---|
| 3,272,330 A | 9/1966 | Nelson |
| 3,672,496 A | 6/1972 | Williams |
| 4,055,489 A | 10/1977 | Soley |
| 4,337,900 A | 7/1982 | Williams et al. |
| 4,738,367 A | 4/1988 | Barrett |
| 5,230,917 A | 7/1993 | Peters |
| 5,341,937 A | 8/1994 | Vos |
| 5,464,100 A | 11/1995 | Oka |
| 5,797,498 A | 8/1998 | Kobayashi et al. |

OTHER PUBLICATIONS

Eurocrusher, (advertisement), date unknown.

Recycling Research Institute, "Getting the Wire Out," *Scrap Tire News*, (newsletter), Dec. 2002, pp. 1 & 3,; Recycling research Institute, Leesburg, Virginia.

Ohio Magnetics, Inc. / Stearn Magnetics, "Magnet Drum Separators," (webpage), Dec. 12, 2002 Ohio Magnetics, Inc., Maple Heights, Ohio.

Action Equipment Co., Inc., "General Arrangement Grizzly Discharge Conveyor," (drawing of product on sale Jul. 25, 1999, Action Equipment Co., Inc., Newberg, Oregon.

IEP International , Inc., "Permanent Suspended Magnetic Separators," Web page (http://www.ipesmag.com/permanent.html), copyright 2003.

Dings Magnetic Group, "Overhead Magnetic Separators." Web page (http://www.dingsmagnets.com/products/Suspended-(Overhead)-Magnets/index.asp), copyright 2002.

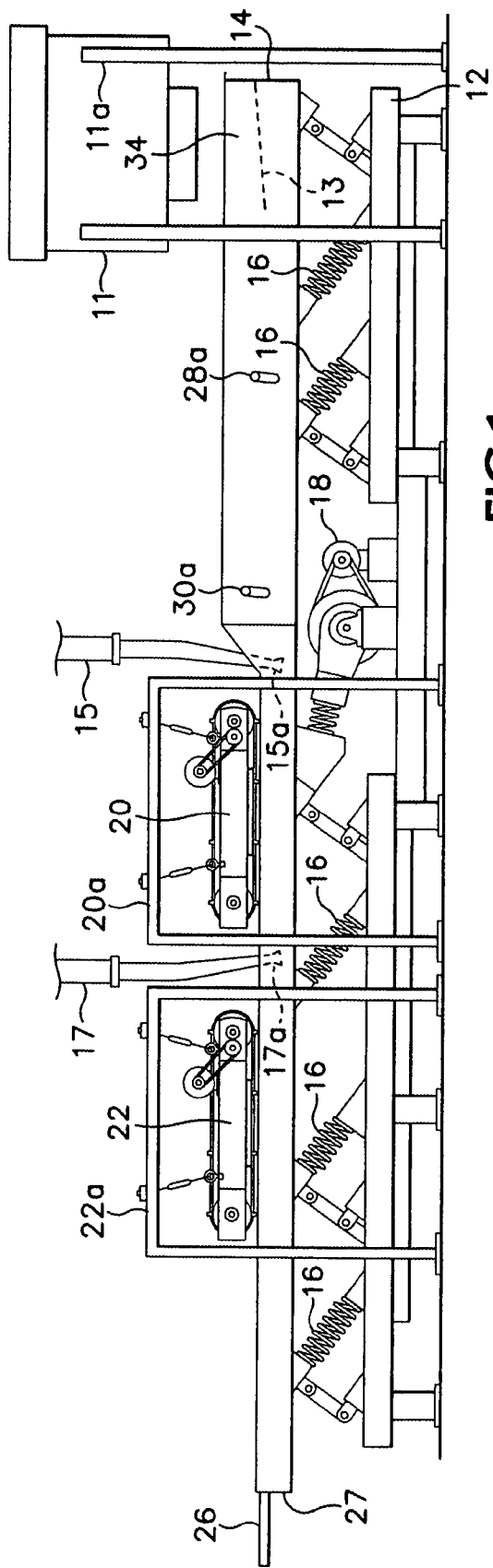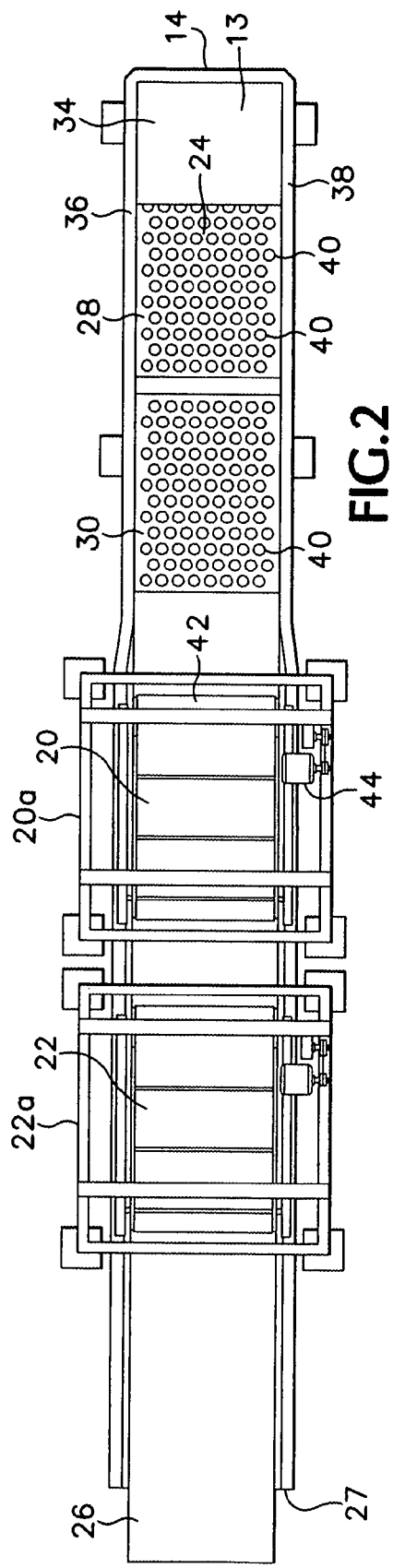

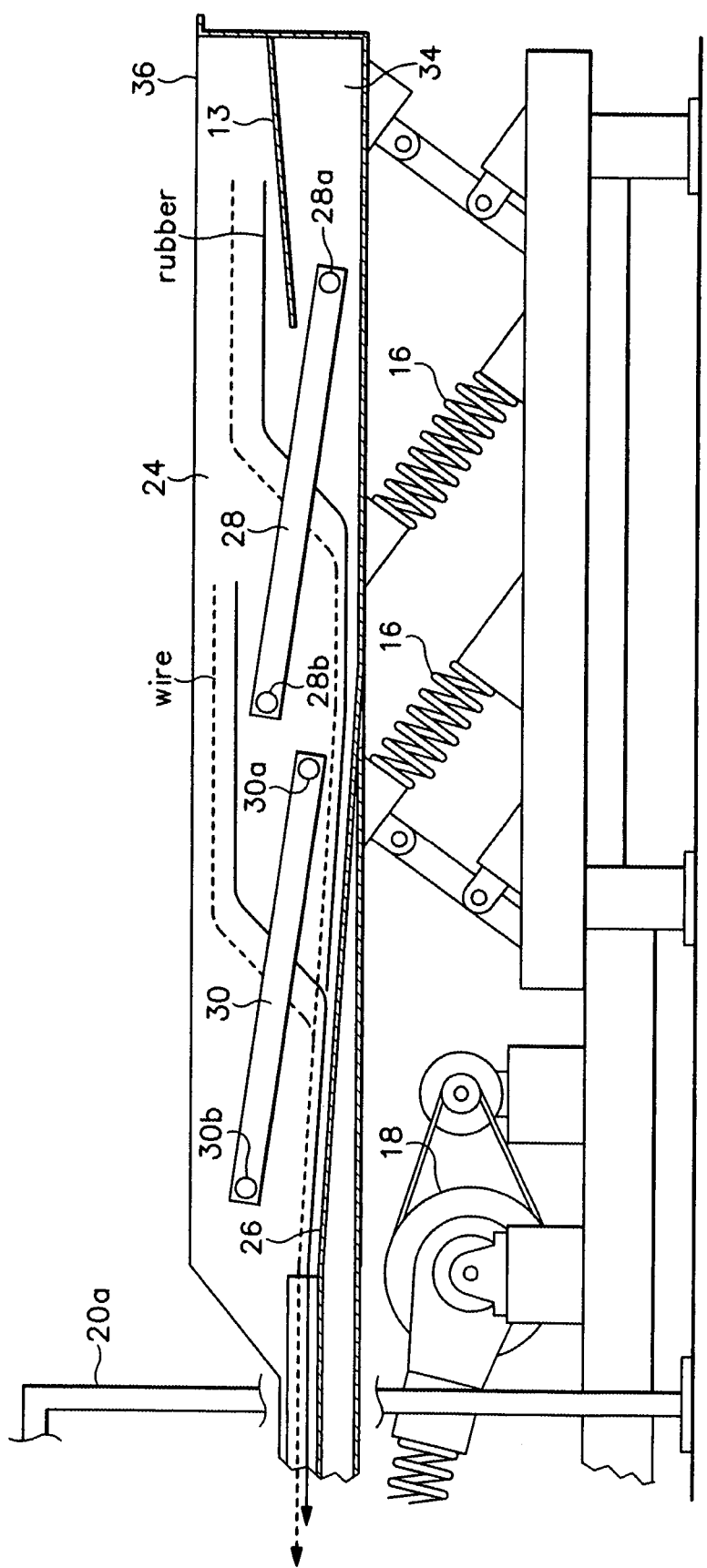

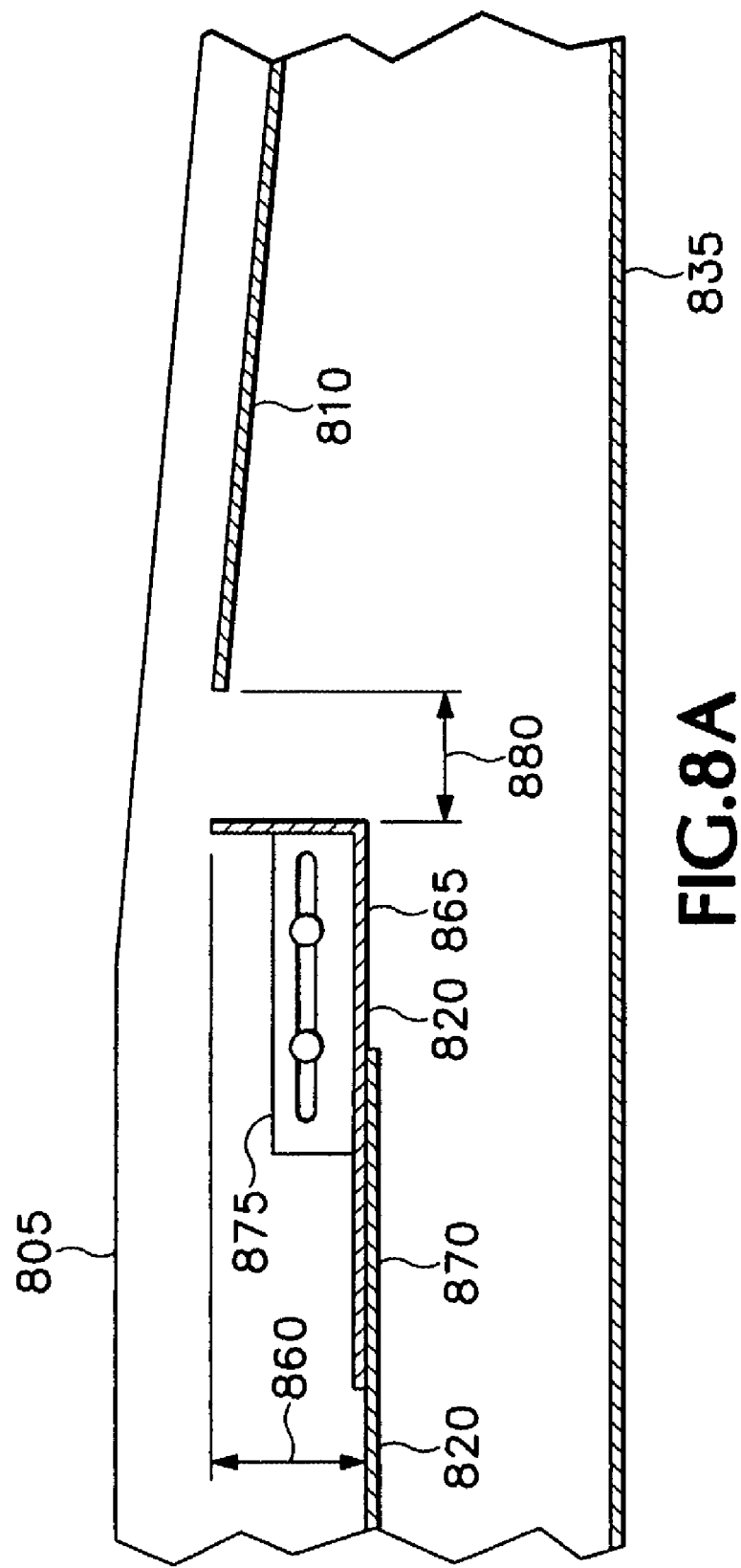

FREE WIRE RECLAIMER WITH IMPROVED MAGNETIC SEPARATION

CROSS-REFERENCE TO RELATED APPLICATIONS

This is a Continuation-In-Part of U.S. patent application Ser. No. 10/345,689 filed on Jan. 15, 2003 now U.S. Pat. No. 7,090,080, entitled "Free Wire Reclaimer System For Scrap Tire Processors." The specification of the above application is incorporated herein by reference.

BACKGROUND OF THE INVENTION

The following invention relates to a system for liberating metal in processed granulated material that may contain metal parts, such as wire, in a granulated stream of ground-up metallic and nonmetallic components, such as steel belted rubber tires.

Tires are recycled by grinding and shredding the tires to form a granular stream of material. Size reduction machines grind whole tires while downstream devices called "granulators" further reduce particle sizes. Radial tires however, and in particular steel-belted radial tires, contain wire embedded in the rubber. In order to reclaim the wire and rubber in the granulated tires separately, it is necessary to first remove the wire from the rubber in the granulated stream.

Reclaiming rubber and metal wire is a difficult process because even separated chunks of wire and rubber tend to clump together forming interwoven mats, small "birds' nests," and other matrices of wire/rubber material. The rubber and steel mixture discharged from a granulator has been found to be at least 90% separated so that it should be feasible to reclaim the rubber and the wire correspondingly.

Conventionally, tire processors attempt to use cross-belt magnets to pick wire from a stream of material downstream from the output of a granulator. A conventional type of cross-belt magnetic separator is shown in U.S. Pat. No. 5,230,917 to Peters entitled "Method for Separation of Canned Goods and Reclaiming Useful Food Values Therefrom." A different type of magnetic separator is shown in U.S. Pat. No. 4,055,489, Soley, "Magnetic Separator for Solid Waste." Cross-belt magnets that attempt to separate wire from rubber are positioned at a 90° angle to a fluidized wire/rubber stream and attempt to pick the wire out of the stream. However, the mostly fluidized stream of granulated wire and rubber material that enters the magnetic field of the cross-belt magnet frequently becomes magnetized, forming a woven wire matrix with entrapped rubber. In addition to becoming magnetized, the previously separate materials change direction (i.e., make a 90° turn) as they are pulled to the corner of the magnet and are impacted by large cleats commonly found in the conveyor belts that pull the material across the cross-belt magnet. All these factors contribute to the formation of clumps of metallic and nonmetallic material mixed together.

The foregoing and other objectives, features, and advantages of the invention will be more readily understood upon consideration of the following detailed description of the invention taken in conjunction with the accompanying drawings.

BRIEF SUMMARY OF THE INVENTION

The apparatus of the invention aids in reducing clumping in a granular stream of mixed wire and rubber and separates wire from shredded rubber more efficiently. The apparatus includes a vibrating conveyor assembly that includes upper and lower troughs. An in-line magnetic separator is situated above the vibrating conveyor assembly and attracts metal pieces from the shredded rubber. A belt carries metal pieces attracted to the magnet in the magnetic separator across a gap in the upper trough while rubber pieces are allowed to fall through the gap onto the lower trough. After clearing the gap, metal falls from the belt onto the upper trough. Separation of metal from rubber is further aided by a "declumping" zone which comprises a deck having holes or perforations and which may be placed at a slight incline with respect to the vibrating conveyor assembly. As the material is shaken and falls through the holes, clumps are broken apart and separated which makes it easier for the magnetic separator to lift wire pieces out of the mixed rubber and wire stream.

BRIEF DESCRIPTION OF THE SEVERAL DRAWINGS

FIG. 1 is a side elevation view of a preferred embodiment of a wire liberating system.

FIG. 2 is a plan view of the apparatus of FIG. 1.

FIG. 3 is a partial side elevation cutaway view of a portion of the apparatus of FIG. 1 illustrating a wire/rubber declumping zone.

FIG. 8A is a detail side elevation view of an adjustable gate and a vertical drop between the input upper trough and the output upper trough, according to one embodiment.

DETAILED DESCRIPTION OF PREFERRED EMBODIMENTS

Figure 4:
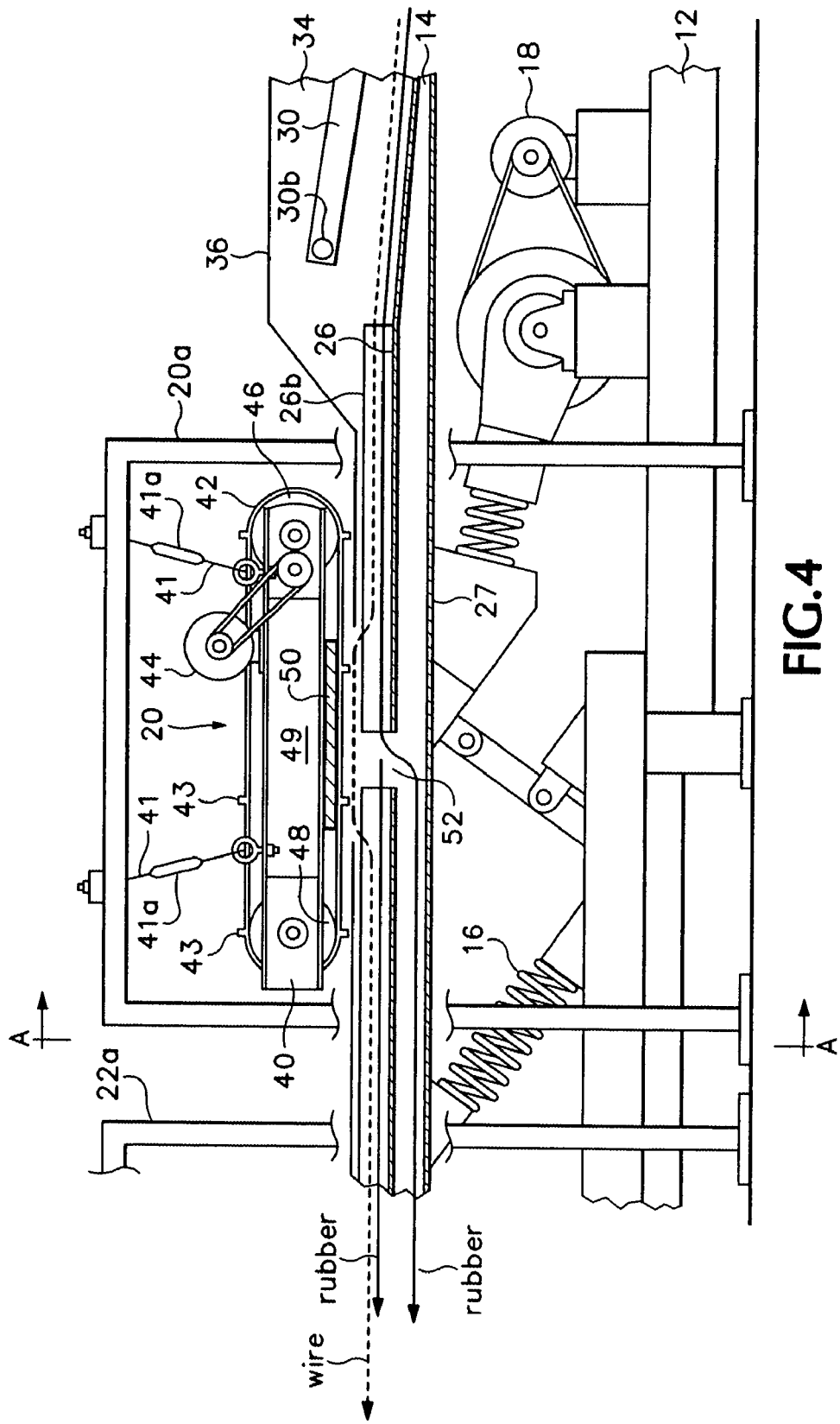
FIG. 4 is a partial side elevation cutaway view of one of the magnet separator units of the apparatus of FIG. 1.

A free wire reclaiming apparatus 10 (refer to FIGS. 1 and 2) includes a frame 12 and a vibrating conveyor assembly 14. The apparatus 10 is fed by a granulator 11 supported by a frame 11a which sits astride the conveyor 14. The conveyor 14 includes a distribution plate 13 (shown in dashed outline). The distribution plate 13 is an angled plate that spreads out the product of the granulator 11 as it drops so that it is dispersed more evenly onto the conveyor 14. The vibrating conveyor 14 is a rigid unit suspended on the frame by spring assemblies 16 that allow the conveyor 14 to vibrate when driven by a motor assembly 18. The motor assembly 18 provides a linear impulse motion of a predetermined stroke length, which determines the amplitude of vibration of the vibrating conveyor 14. Action Equipment Company, Inc. of Newberg, Oreg. manufactures vibratory conveyors of this type.

A pair of magnetic separator units 20 and 22 is suspended from respective frames 20a and 22a, respectively. The frames 20a and 22a sit astride the conveyor 14 and its frame 12. The separator units 20 and 22 are situated in-line with the flow direction of conveyor 14 and thus reclaim metallic material from the mixed stream of metallic and nonmetallic material so as to create separate streams flowing in the same direction.

FIG. 3 shows the upstream or input end of the separator apparatus 10. The input end will be referred to herein as a "declumping zone" 24. The declumping zone 24 includes a slightly inclined upper trough 26 and a pair of perforated decks 28 and 30. The upper trough 26, which is slightly inclined in the declumping zone 24, becomes horizontal at its output. Sidewalls 36 and 38, which keep material from spilling over, are attached on opposite sides of the upper deck trough 26. A lower trough 27 extends horizontally from the declumping zone 24 all the way to the output of the separator 10.

Granulated material comprising wire (represented by a dashed line) and rubber (represented by a solid line) is deposited onto the distribution plate 13 in an input tray 34. The decks 28 and 30 are both rotatable about respective pivot points 28a and 30a. The decks may be secured at varying angles of inclination at ends 28b and 30b, respectively, which may be affixed to the sidewalls 36 and 38, respectively, of the declumping zone 24. The perforated decks 28 and 30 contain holes or apertures 40 through which separated wire and rubber components are allowed to drop. Under the action of the vibratory deck 14, clumps of mixed wire and rubber material are shaken apart and fall through the perforations 40 in the decks 28 and 30 to form a granular stream of separated wire and rubber (i.e., the components are no longer clumped together). The inclined decks also provide a vertical drop for the material stream from one deck 28 to the next deck 30 and from the deck 30 to the upper trough 26. The entire assembly vibrates and this causes tumbling of the material as it drops. The tumbling effect helps to dislodge and break apart clumps of material. The stream is then conveyed to the next downstream components of the apparatus, the magnetic separators.

A magnetic separator section 20 is shown in FIG. 4. While there are more that one such device shown herein, only the first section 20 will be described in detail because the other magnetic separators are substantially similar insofar as their detailed structure. The magnetic separator unit includes a motorized endless belt assembly constructed on a frame 49 that is suspended from the frame 20a which sits astride the vibratory conveyor 14. The frame 49 supports a pair of pulleys 46 and 48 that are mounted for rotation on the frame 49. An endless belt 42 extends around the pulleys, which are, in turn, driven by a motor 44 so that the belt 42 moves in the direction of material flow along the vibratory conveyor 14. The endless belt 42 is stretched tight between the pulleys 46 and 48 so that it slides over a magnet 50 that is attached to the underside of the frame 49. The magnet 50 may be a single magnet or may be a series of magnets that are dimensioned so as to span the width of a gap 52 which exists in the upper trough 26. The endless belt 42 is fairly taut between the pulleys 46 and 48, and when metallic objects approach the magnet 50, they are attracted toward the magnet. However, because the magnet's field extends through the relatively thin endless belt 42 that slides across it, metal pieces such as wires are held against the endless belt 42 and are, as a result, propelled across the gap 52. The distance between the pulleys 46 and 48 is relatively long, being much longer than either the gap 52 or the lineal length of the magnet 50. For this reason, as soon as the metal pieces (represented by the dashed line in FIG. 4) clear the forward end of the magnet 50, they fall from the belt 42 onto the upper vibratory trough 26. The endless belt 42 also has small transverse cleats 43 that aid in propelling the magnetically attracted material across the gap 52 and onto the upper trough at the other side of the gap. Nonmetallic material such as rubber (as illustrated by the solid line in FIG. 4) is not attracted to the magnet 50 and therefore falls through the gap 52 onto the lower trough 27.

The magnetic separator unit 20 is a modular apparatus that is not physically attached to the vibrating conveyor. A plurality of such separator units may be used in conjunction with the conveyor and it is sometimes advantageous to do so because additional separating steps provide a greater degree of refinement in the process of separating metallic material from nonmetallic material in the stream. Thus, while the application herein shows two such units placed in-line with the vibratory conveyor mechanism, more magnetic separator units may be used if desired.

A feature of each magnetic separator unit is the adjustability of the magnet 50 relative to the upper trough 26. The cables 41 each have a turnbuckle 41a which may be used to raise or lower the frame 49 and hence regulate the distance between the magnet 50 and the upper trough 26. Each magnetic separator unit may be adjusted to a height and orientation that optimizes the separation of wire and rubber. For example, one or more magnetic separator unit may be oriented in an inclined manner whereby the leading edge of the magnetic separator is positioned at a lower height with respect to the upper trough 26 than the trailing edge of the magnetic separator to further improve the release of wire magnetically captured from the wire and rubber stream. That is, the turnbuckle 41a nearest to the pulley 46 (nearest to the leading edge of the magnetic separator 20) may be adjusted to a height lower than the turnbuckle 41a nearest to the pulley 48 (nearest to the trailing edge of the magnetic separator 20) so that the magnetic separator 20 is oriented in an inclined manner with respect to the upper trough 26.

To avoid magnetic linkage between the vibratory conveyor itself and the magnet unit 50, the vibrating troughs should be made of stainless steel, at least within the area of each of the magnetic separator units. The width of the gap 52 that exists in the upper trough 26 should be made large enough so that nonmetallic material, such as rubber, does not carry over and become inadvertently deposited in the upper trough. If desired, a lip extending upwards may be added to the downstream end of the gap 52 to guarantee that metallic materials do not find their way back into the gap 52 and onto the lower trough 27. In practice, it has been found that a gap width of six to seven inches is optimal for a granulated wire/rubber mixture.

The combined wire and rubber streams (represented by the dashed lines and solid lines respectively) are propelled along the upper trough 26 by the action of the vibratory conveyor 14 as driven by the motor assembly 18. As the wire components approach the magnet 50, they are lifted, held against the endless belt 42 and propelled across the gap 52 aided by the cleats 43. The rubber, which is not magnetized, drops through the gap 52 into the lower trough 27. Some wire and rubber remain mixed however, and this mixture is fed to the second magnetic separator 22.

Figure 5:
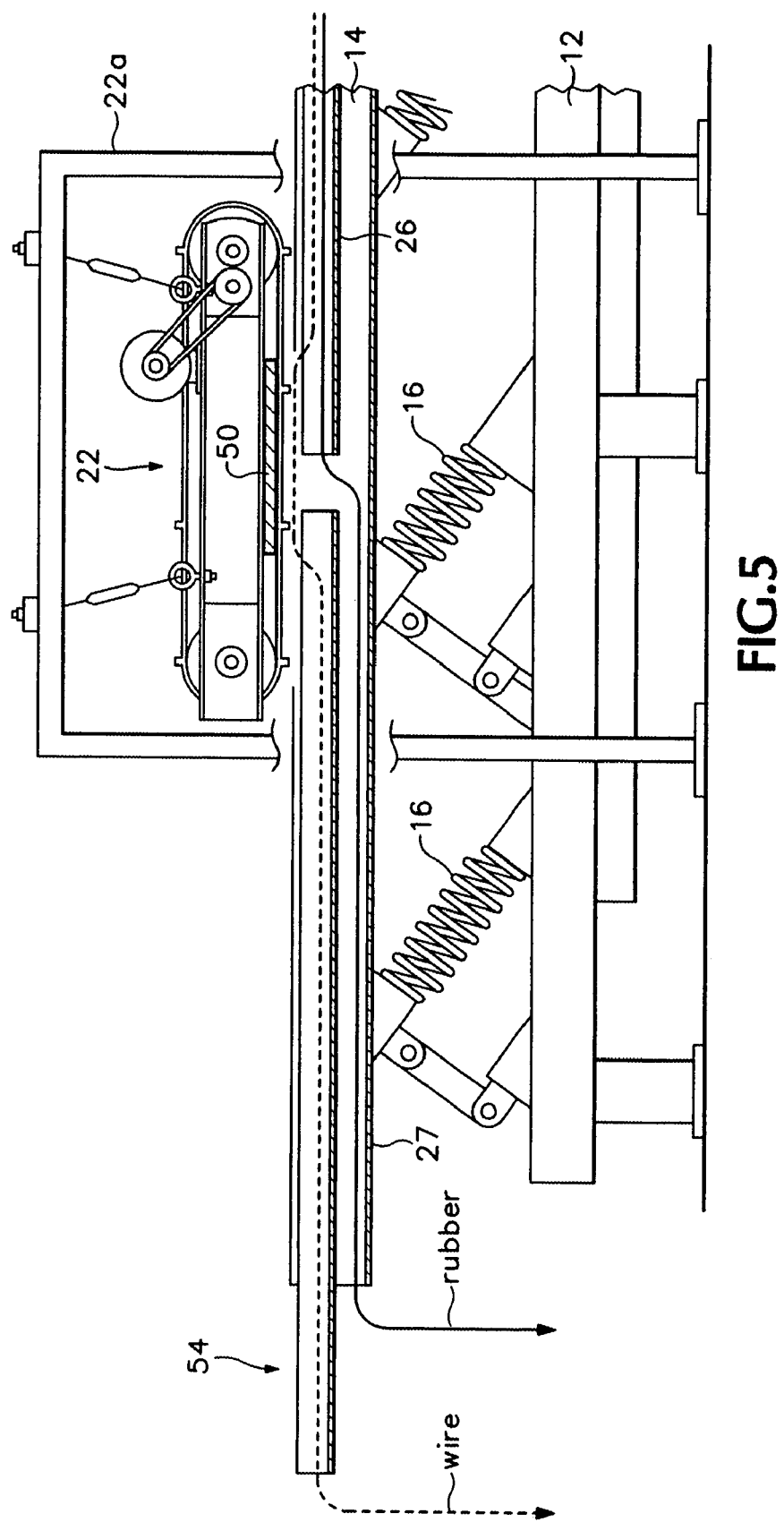
FIG. 5 is a partial side elevation cutaway view of the downstream end of the apparatus of FIG. 1.

Referring to FIG. 5, the second magnetic separator 22 effectively removes most of the remaining wire from the wire/rubber mixture. With most metal/nonmetal mixtures, a high degree of separation can usually be obtained. It should be appreciated that it is difficult to predict the exact percentage of separation between metallic and nonmetallic materials due to the number of variables involved in each potential application. If the separator is to be used for tire processing, the percentages may depend upon the type of tire processed. Truck tires provide a greater degree of separation than do passenger tires. Certain types of passenger tires have differing amounts of steel in the sidewall area and the liberation of metallic components from such sidewalls is difficult because the pliability of the sidewalls requires more mechanical reduction in order to reach the same percentage of separation. Moreover, the age of the tires, tread percentage relative to total weight and the number of other types of tires (for example bias-ply tires) affect the separation percentages. In general, passenger tires have a higher fiber content in the rubber in comparison to truck tires. Thus, the most efficient liberation of metal from nonmetallic components for such tires frequently requires aspiration to dislodge fluffy fiber from the mixture. Aspirators 15 and 17 are provided in FIG. 1, which are suction hoses with laterally elongated vacuum heads 15*a* and 17*a*, which may span the width of the vibratory conveyor 14. While aspirators 15 and 17 are shown placed before and after the first magnetic separator, the aspiration step could be performed prior to the material entering the declumping zone. The suction hoses remove light fluffy material from the stream which otherwise might become tangled with wire and tend to cause clumps of mixed fibrous, rubber and wire material to form. As many aspirators as necessary may be used. The number of aspirator stages will be determined largely by the amount of fibrous content that is likely to be encountered.

Both wire and rubber components are separated at the output of the second magnetic separator such that most of the rubber is conveyed exclusively by the lower deck 27 while most of the wire is constrained within the upper deck 26. At the output of the separator (generally indicated at 54 in FIG. 5), the wire and rubber may be directed to separate appropriate output receptacles (not shown).

Figure 5A:
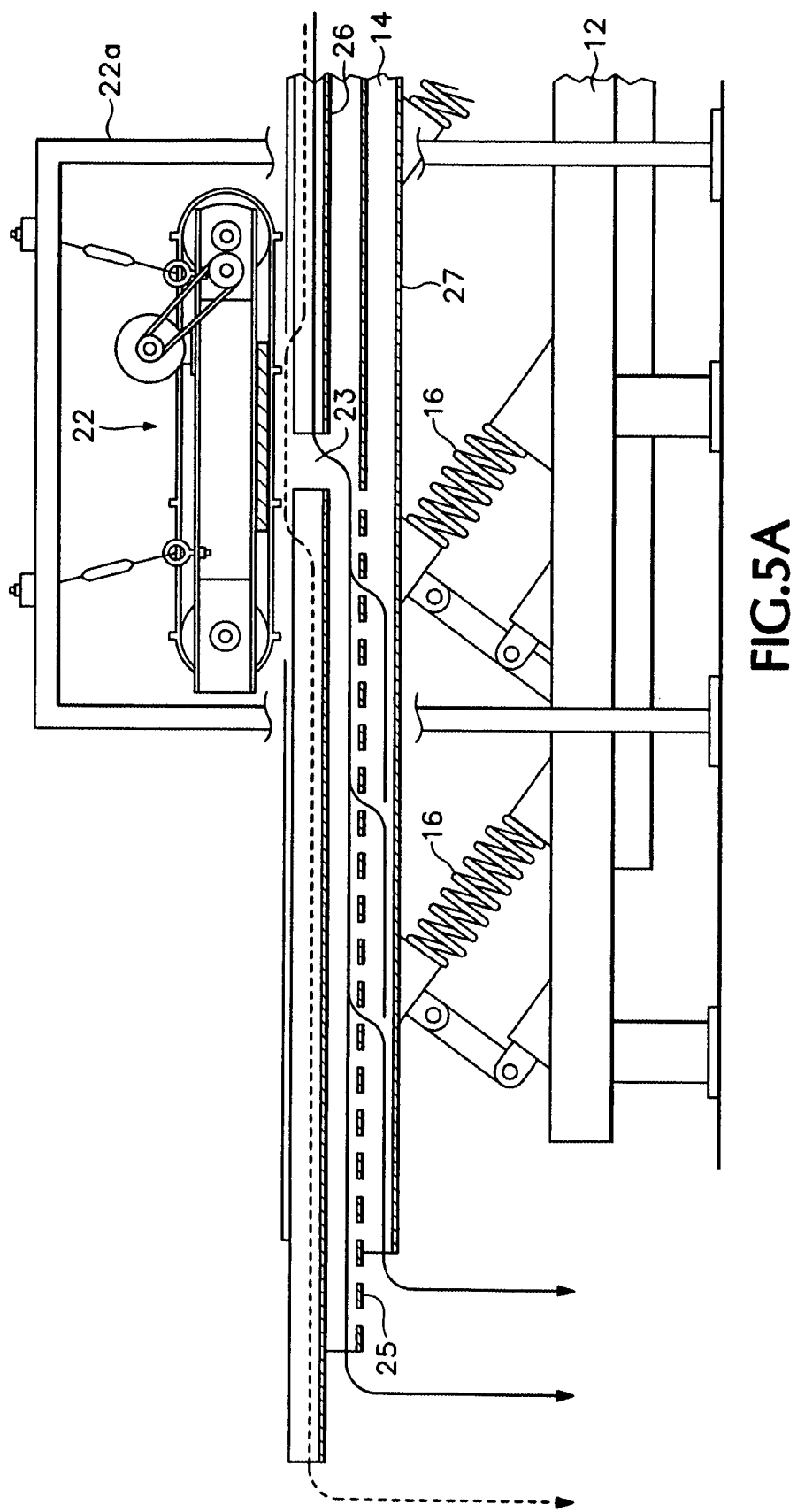
FIG. 5A is an alternative embodiment showing the same view as FIG. 5 but containing a sizing screen.

A variation of the end portion of the apparatus of FIG. 5 is shown in FIG. 5*a*. In FIG. 5*a*, in addition to the upper through 26 and lower trough 27, a sizing screen 25 is provided which screens selected sizes of rubber pieces. Smaller pieces of rubber fall through the screen and are collected in an appropriate receptacle (not shown). Larger pieces may then be collected as desired or may be recycled back to the granulator for further size reduction.

Figure 7:
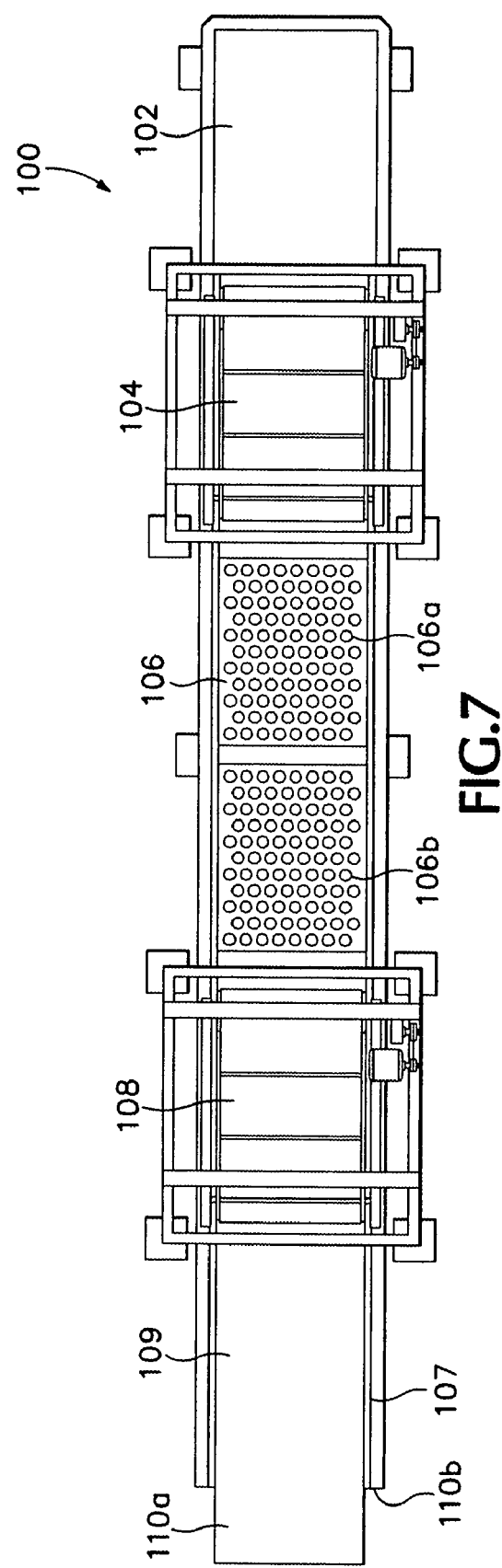
FIG. 7 is a plan view of a second embodiment of the invention in which the declumping zone is placed between two magnetic separator sections.

Referring to FIG. 7, an alternative embodiment of the invention is shown in which the declumping zone is positioned between two in-line magnetic separators. A wire separator apparatus 100 has an input tray 102. Mixed wire and rubber encounters a magnetic separator unit 104 that, at least partially, removes wire from the stream depositing it in an upper vibratory trough 109 while allowing free rubber to fall into a lower vibratory trough 107. The free rubber material in the lower vibratory trough 107 proceeds below the declumping zone 106 while the wire material picked up by the magnetic separator 104 is deposited onto the perforated ramps 106*a* and 106*b* of the declumping zone 106. Declumping is necessary due to the effect of the magnetic separator unit 104 that may tend to pick up wire pieces which, when magnetized, form a matrix entrapping free rubber granules. The declumping zone 106 is, in all respects, similar to the apparatus shown in FIG. 3 with the exception that the free rubber granules have been deposited into the lower trough 107, which runs underneath the declumping zone 106. The output of the declumping zone 106 is fed to a second in-line magnetic separator 108. Free rubber granules are deposited in the lower trough 107 while the separated wire is deposited in the upper trough 109. The lower trough 107 feeds to an output end 110*b* while the upper trough 109 feeds separated wire to the output end 110*a*.

Appropriate collections bins (not shown) are placed below the ends of the upper and lower troughs 107 and 109, respectively.

The apparatus described herein is usually positioned at the output of a granulator. This device is a machine that shreds and grinds pieces of tires that have been previously shredded by size reduction machines. The output of a conventional granulator is typically a ⅜" to ½" chunk of material. The input end 34 of the wire reclaimer system 10 of the invention is narrow in order to fit properly beneath a conventional granulator. If, however, the input to the system comes from a conveyor belt, this may not be necessary. The input may be sized to accommodate differing types of inputs from size reduction machines, granulators or other inputs depending upon the output of the particular apparatus employed.

The vibrating conveyor is made to vibrate by the motor 18, which delivers a periodic linear impulse that is transmitted to the conveyor through a spring. The length of the stroke of the motor determines the amplitude of vibration. For optimum use, a relatively long stroke, that is, greater than or equal to one inch, should be used so as to provide sufficient agitation to cause granulated rubber particles to become jarred loose from granulated wire. In addition, the conveyor should be of sufficient length to allow for a long dwell time. Typical separator units of this type may be thirty-five feet long and the length could easily increase to forty or forty-five feet so as to increase the dwell time for more complete and efficient separation. A typical conveyor speed is around sixty feet per minute (60 FPM) in a tire processing application. Other applications for different materials may require different speeds.

In addition, other types of magnetic separators could be used with the apparatus described herein. The particular form of the magnetic separator unit is not critical and magnetic separators, which include magnetic drums or clad belts instead of the rubber belt with cleats illustrated in the preferred embodiment, may be used. Different types of magnet configurations may be used as well. It has been discovered that magnets with differing orientations with respect to their north-south fields help to agitate magnetic materials as they move close to the field. This causes the magnetic material to snap or jump abruptly toward the magnets in the separator unit so as to help dislodge nonmagnetic chunks of material which might otherwise be trapped between pieces of metal. Also, the conveyor belt speed of the magnetic separator units should be made to be relatively fast. A conveyor belt speed of up to four hundred feet per minute is recommended.

Certain features in the declumping zone or zones provide adjustability for optimum performance. The perforated decks 28 and 30 are inclined with respect to the horizontal plane, which can be defined as the bottom of the conveyor. The amount of inclination is variable. It has been found that the optimum angle of inclination of the perforated decks is about 5°, but the angle may range from 5° to 15° depending upon placement (flat vs. angled), conveyor speed and other factors. A longer declumping zone provides more dwell time and hence additional untangling of rubber granules from wire.

Figure 5B:
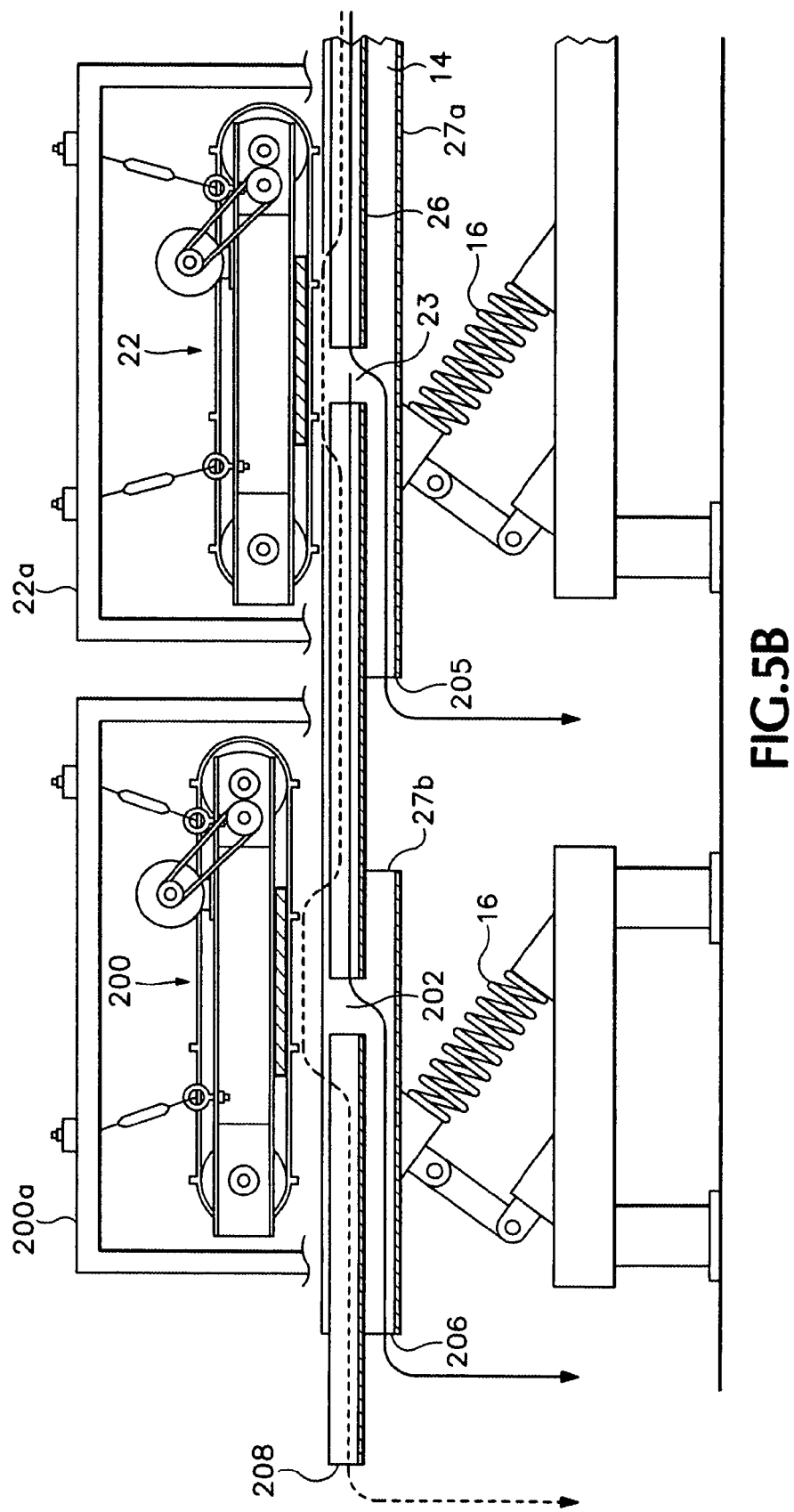
FIG. 5B is a side elevation view of an alternative embodiment using three in-line magnetic separators.
Figure 6:
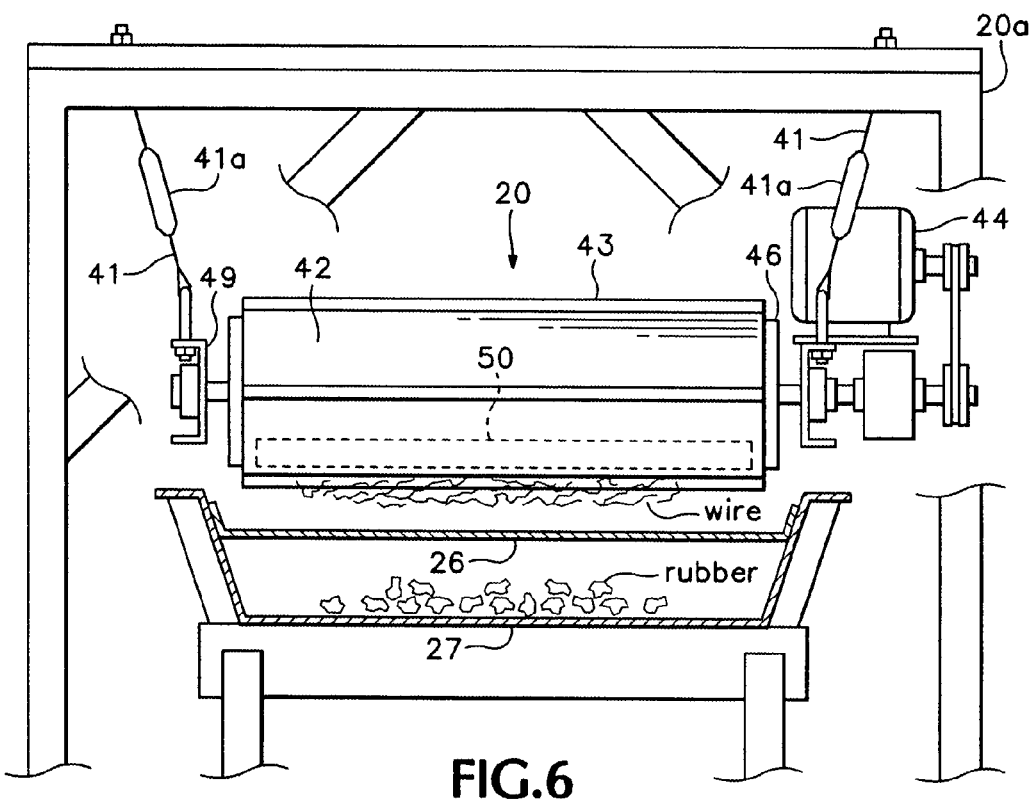
FIG. 6 is a cutaway end view of the apparatus of FIG. 1 taken along line A-A.

Another desirable feature is the adjustability of the magnets and the magnetic separators relative to the vibratory conveyor. Making the magnets adjustable in height above the upper trough permits field tuning. The magnet can be raised, if desired, to ignore potentially small pieces of wire that could be embedded in a rubber granule. In a tire processing application, heights from three inches to nine inches above the upper trough represent a preferred range, but this parameter may vary depending upon the materials in the stream, the speed of the conveyor and the degree of separation between metal and nonmetal prior to reclamation of metal by the magnetic separator units. Thus, a further embodiment of the free wire reclaimer system is shown in FIG. 5B. Like FIG. 5A, the apparatus of FIG. 5B is an alternative to the downstream end of the system which is illustrated in FIG. 5. The difference between the system configuration of FIG. 5B and system configurations of FIG. 5 and FIG. 5A is that in FIG. 5B there is a third magnetic separator assembly 200 mounted on a frame 200a. Further, there are separate lower troughs 27a and 27b that sit beneath the gaps 23 and 202, which are positioned beneath the magnetic separators 22 and 200 respectively. In operation, the embodiment of FIG. 5A operates almost the same as the embodiments of FIGS. 1 and 7. The embodiment of FIG. 5A also provides, however, for the reclamation of rubber with some entrained steel. The magnetic separators 20 and 22 are set at a height that is relatively close to the bed of the upper trough 26 B approximately three to five inches. This setting insures that all material with any metal, including not only free wire but also rubber with entrained wire, is picked up and conveyed along the upper trough 26. This allows only nonmetallic clean rubber to fall through a rubber discharge port 204 which is an output of the lower trough 27a. The third magnetic separator 200 is set at a height of seven to nine inches so that only free metal will be picked up. Rubber pieces with some entrained metal will fall through the gap 202 onto the lower trough 27b. From this point, the rubber with entrained steel may be conveyed through an output port 206. Thus, the output end 208 of the upper trough contains only clean steel. The material reclaimed at output port 206 may be recycled to the granulator for further processing to liberate more of the metal from the rubber, and then deposited back in the input 34.

Figure 8:
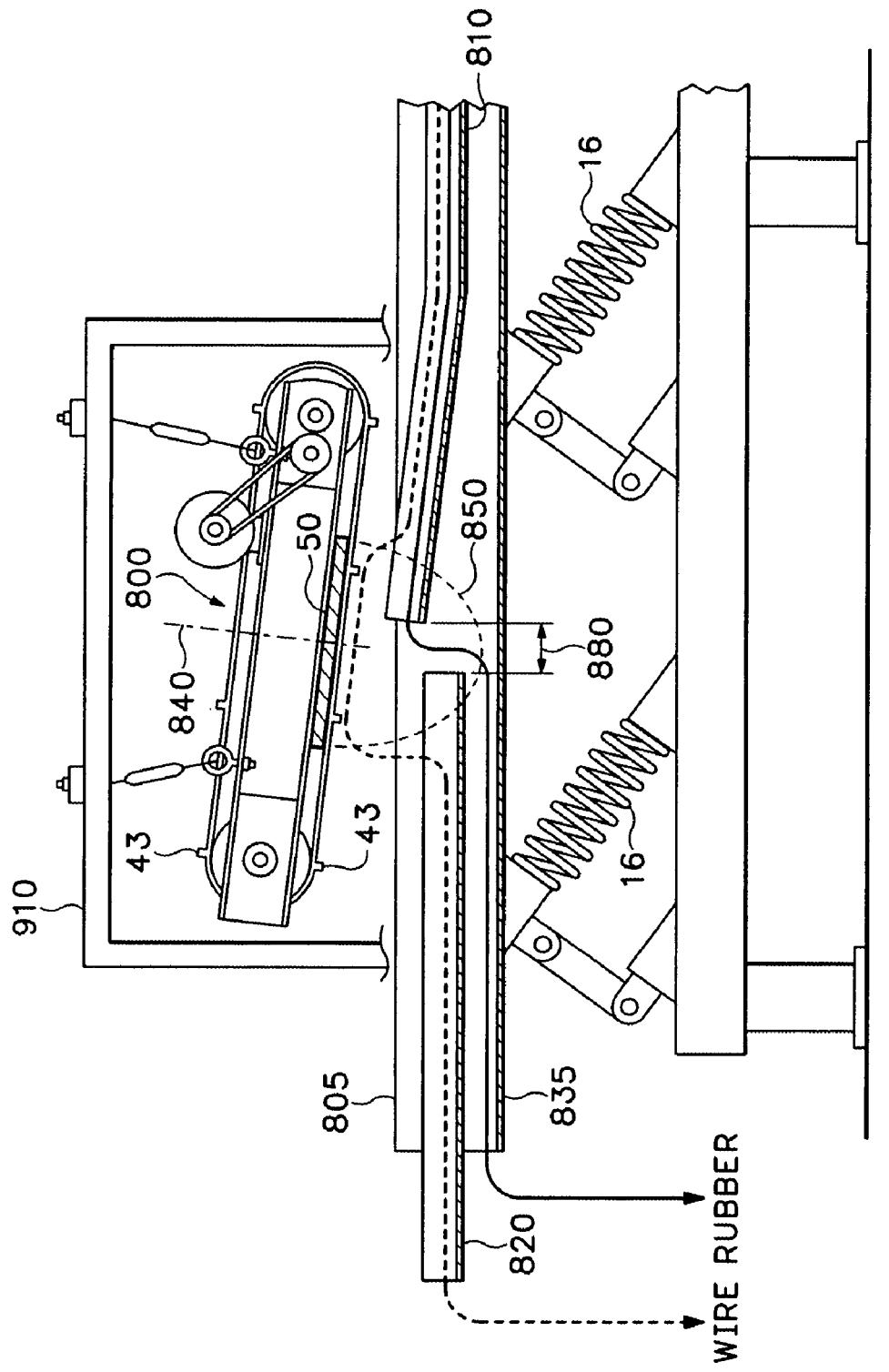
FIG. 8 is a side elevation view of an alternative embodiment in which the magnetic separator is inclined and a vertical drop is added between the input upper trough and the output upper trough.

As previously mentioned, each of the magnetic separators may be adjusted to an inclined orientation to improve the separation of wire and rubber. FIG. 8 illustrates a side elevation view of an alternative embodiment in which the magnetic separator 800 is positioned in an inclined manner above trough portions having sides 805 and in which a vertical drop is incorporated between the input upper trough 810 and the output upper trough 820. As shown, the magnetic separator 800 may be positioned so that the height of its leading edge above the input upper trough 810 is less than the height of its trailing edge above the output upper trough 820. In operation, material flowing along the input upper trough 810 (such as wire shown in dashed lines and rubber shown in solid lines) passes beneath the magnetic separator 800 and into the magnetic field 850 of the magnet 50. As metallic objects such as wire approach the magnetic field 850, they are attracted toward the magnet 50 and are held against the endless belt, which propels them forward over the gap 880 with the help of cleats 43. As the magnetically attracted material is carried beyond the width of gap 880 and out of the magnetic field 850, the magnetically attracted material drops away from the magnetic separator 800 and onto the output upper trough 820. The vertical drop in height between the input upper trough 810 and the output upper trough 820 helps material that has been carried across the gap 880 and dropped from being re-acquired by the magnetic field 850 of magnet material 50.

For typical conveyor speeds, magnet strengths, trough heights, and so forth, the drop in height between the input upper trough 810 and the output upper trough 820 may be six inches. However, the drop in height may be more or less depending on the strength of magnet 50 and other factors. In a typical configuration, the centerline 840 of the magnet 50 is positioned substantially over the gap 880 so that the magnetic field 850 is strongest over the width of the gap 880 and magnetically attracted material is carried over the gap 880 before dropping downward onto the output upper trough 820.

The gap 880 may be increased or decreased in width by horizontally adjusting one or both of the input upper trough 810 and the output upper trough 820.

In one embodiment, the width of gap 880 may be changed using a horizontally adjustable gate formed into one or both of the input (upstream) upper trough 810 and the output (downstream) upper trough 820. For example, FIG. 8A illustrates a detail side elevation view of an adjustable gate 865 and a vertical drop 860 between the input upper trough 810 and the output upper trough 820, according to one embodiment. As shown, the output upper trough 820 comprises an adjustable gate 865 that is slideably engaged with the downstream (output) portion 870 of the upper trough so as to permit adjustment of the width of the gap 880 between the upstream and downstream sections of the upper trough. The adjustable gate 865 may include a slotted adjustment feature 875 for attachment with the trough assembly sides 805. As the adjustable gate 865 is moved in the direction of material flow (downstream), the width of the gap 880 is increased and the adjustable gate 865 telescopes in a downstream direction, either sliding over or sliding under the downstream portion 870 of the upper trough. The adjustable gate 865 may include, as shown in FIG. 8A, a vertical portion at its leading (upstream) edge for redirecting material falling through the gap 880 to the lower trough 835 below.

Referring back to FIG. 8, the magnetic separator 800 may be oriented in an inclined manner relative to horizontal portions of the wire and rubber flow paths such as the output upper trough 820 and lower trough 835. The input upper trough 810 may be similarly inclined to bring the material into the magnetic field 850. However, a drop between the input upper trough 810 and the output upper trough 820 may be achieved without positioning one or both of the magnetic separator 800 and the input upper trough 810 in an inclined orientation as shown. That is, in an alternative embodiment, one or both of the magnetic separator 800 and the input upper trough 810 may be substantially horizontal and parallel with the lower trough 835 while still incorporating a drop in height between the input upper trough 810 and the output upper trough 820.

The magnetic separator configuration shown in FIG. 8 may be used with any of the previously described systems. For instance, the magnetic separators 20 and 22 shown in FIGS. 1 and 2 may be substituted with magnetic separators having dropped output upper troughs as in FIG. 8.

Figure 9:
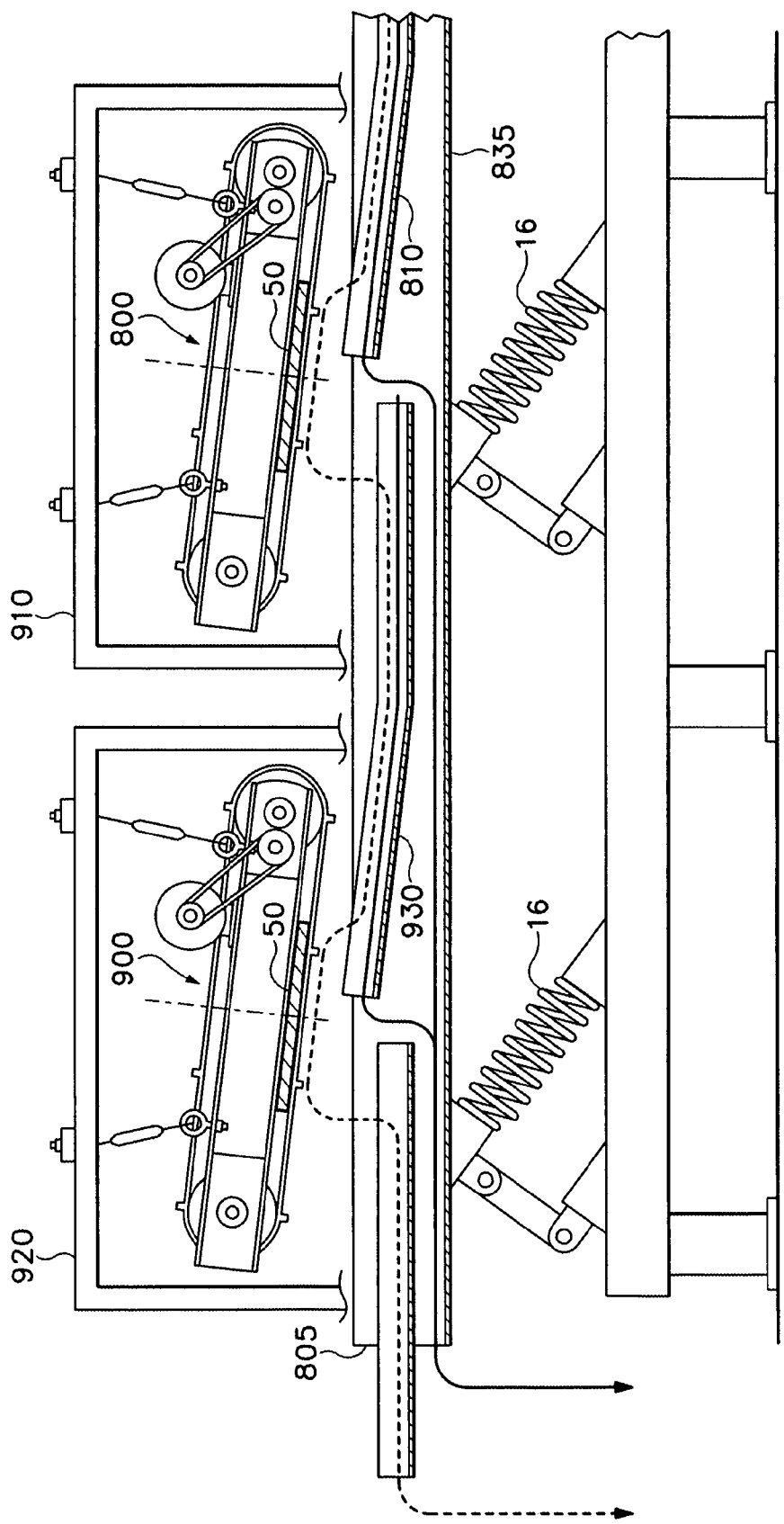
FIG. 9 is a side elevation view of an alternative embodiment having magnetic separators configured as illustrated in FIG. 8.

FIG. 9 illustrates a side elevation view of an alternative embodiment having two inclined magnetic separators similar to the magnetic separator configuration in FIG. 8. A first magnetic separator 800 suspended over the conveyor having sides 805 is shown suspended from the frame 910, and a second magnetic separator 900 is shown suspended from the frame 920. In operation, material flows through the input upper trough 810 and enters the magnetic field of the magnet 50 of the first magnetic separator 800. The material that is not sufficiently attracted to the magnet 50 drops down onto the lower trough 835 and the material that is sufficiently attracted is carried along the endless belt of the magnetic separator 800 until the material is propelled beyond the magnetic field of the magnet 50. The magnetically attracted material then falls onto the upper trough portion 930 that, in the embodiment shown, becomes the input upper trough for the second magnetic separator 900. The material that is not sufficiently attracted to the magnet 50 of the magnetic separator 900 drops down onto the lower trough 835 and the material that is sufficiently attracted is propelled beyond the magnetic field of the magnet 50 where the material then falls onto the output upper trough.

While the preferred embodiment has been described herein as especially useful for separating components of tires, the invention is not limited to tire processing applications. Virtually any process that produces metallic and nonmetallic components in a mixed stream may make use of the invention.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A magnetic separation apparatus for separating metallic material from a granulated stream of mixed metallic and nonmetallic material, the apparatus comprising:
   (a) a vibratory conveyor including a trough assembly suspended on springs and a motor for causing vibration of the trough assembly to thereby move material in a predetermined direction of material flow, said trough assembly including an upper trough having at least three sections aligned in said predetermined direction of material flow and a lower trough extending in the same direction as and beneath said upper trough, said upper trough having at least two gaps of a predetermined width between said sections so as to permit material to fall onto the lower trough, at least one of said at least two gaps between a downstream section and an upstream section having said downstream section positioned at a height lower than said upstream section thereby forming a vertical drop between the two sections with said gap therebetween, and
   (b) a magnetic separator positioned above each of said gaps in said upper trough and each magnetic separator comprising a magnet member and an endless belt moving in said direction of material flow relative to said vibratory conveyor, the endless belt positioned so as to slide over the magnet member, the magnet member being positioned above and spanning the width of said gaps in said upper trough.

2. The apparatus of claim 1, wherein said vibratory conveyor further comprises a first conveyor section positioned upstream from said magnetic separator, the conveyor section including at least one perforated deck coupled to said trough assembly, the perforated deck having apertures of a predetermined size.

3. The apparatus of claim 2, wherein the first conveyor section includes at least a pair of perforated decks, each of said perforated decks being pivotally mounted to said trough assembly and having a range of adjustment about a pivot point so as to permit said decks to be upwardly inclined.

4. The apparatus of claim 2, wherein said at least one perforated deck is inclined at an angle to a horizontal plane.

5. The apparatus of claim 2, further including a size reducing machine positioned to deposit material onto said vibratory conveyor at said first conveyor section.

6. The apparatus of claim 5, further including a distribution plate for distributing material evenly to said first conveyor section from said size reducing machine.

7. The apparatus of claim 1, wherein said magnetic separator is positioned in an inclined manner with respect to a horizontal plane such that an upstream end of said magnetic separator is lower than a downstream end of said magnetic separator.

8. The apparatus of claim 1, wherein said endless belts include cleats or ridges.

9. The apparatus of claim 1, wherein said trough assembly further includes a vibratory sizing screen extending beneath a gap in said upper trough and above said lower trough.

10. The apparatus of claim 1, further including at least one aspirator positioned above said vibratory conveyor for extracting fibrous material.

11. The apparatus of claim 1, wherein for each of said gaps said predetermined width may be adjusted by horizontally repositioning one or both of said downstream section and said upstream section of said upper trough.

12. The apparatus of claim 11, wherein said predetermined width may be adjusted by horizontally repositioning an adjustable gate portion slideably engaged with said downstream section of said upper trough.

13. An apparatus for separating metals from nonmetals in a granular stream comprising:
   (a) a vibratory conveyor including a trough assembly suspended on springs and a motor for causing a vibration of the trough assembly to thereby move material in a predetermined direction of material flow and having a conveyor section including an upper trough having at least three sections substantially horizontally aligned and a lower trough extending substantially parallel to the upper trough sections, the upper trough having at least two gaps of a predetermined width between said sections so as to permit material to fall onto the lower trough; and
   (b) a magnetic separator positioned above each of said gaps in said upper trough and comprising each a magnet member and an endless belt moving in said direction of material flow relative to said vibratory conveyor, the endless belt positioned so as to slide over the magnet member, the magnet member being positioned above and spanning the width of each said gap in said upper trough.

14. The apparatus of claim 13 wherein said vibratory conveyor further includes an upstream conveyor section placed upstream of said conveyor section having upper and lower troughs, said upstream conveyor section including at least a pair of perforated decks, each of said perforated decks having apertures of a predetermined size, and each of said perforated decks being pivotally mounted to said trough assembly and having a range of adjustment about a pivot point so as to permit said decks to be upwardly inclined.

15. The apparatus of claim 13 wherein said conveyor section having upper and lower troughs further includes a vibratory sizing screen extending beneath a gap in said upper trough and above said lower trough.

16. The apparatus of claim 13 wherein said endless belts include cleats or ridges.

17. The apparatus of claim 13 wherein said vibratory conveyor further includes an upstream conveyor section placed upstream of said conveyor section having upper and lower troughs, said upstream conveyor section including at least one perforated deck coupled to the trough assembly, the perforated deck having apertures of a predetermined size, and further including a size reducing machine positioned to deposit material onto said vibratory conveyor at said upstream conveyor section.

18. The apparatus of claim 17 further including a distribution plate for distributing material evenly to said upstream conveyor section from said size reducing machine.

19. The apparatus of claim 13 wherein said vibratory conveyor further includes an upstream conveyor section placed upstream of said conveyor section having upper and lower troughs, said upstream conveyor section including at least one perforated deck coupled to the trough assembly, the perforated deck having apertures of a predetermined size, wherein said at least one perforated deck is inclined at an angle to a horizontal plane.

20. The apparatus of claim 13 further including at least one aspirator positioned above said vibratory conveyor for extracting fibrous material.

21. The apparatus of claim 13 wherein said upper trough includes at least two gaps.

22. An apparatus for separating metallic material from a granulated stream of mixed metallic and nonmetallic material comprising:
(a) a vibratory conveyor comprising a trough assembly mounted on a suspension system and coupled to a motor for causing the suspension system to vibrate and thereby move material in a predetermined direction of material flow, the trough assembly including upper and lower vibrating troughs extending parallel to one another, and conveying said material in said predetermined direction, the upper trough including at least a pair of gaps of a predetermined width, each of said troughs being arranged so as to feed a different output collection point; and
(b) at least a pair of magnetic separators arranged above said gaps in said upper trough wherein each of said magnetic separators comprises an endless belt sliding across a magnetic member in said direction of material flow positioned so as to span the width of a gap in said upper trough.

23. The apparatus of claim 22 wherein said endless belt includes cleats or ridges.

24. The apparatus of claim 22 wherein said trough assembly further includes at least one declumping zone comprising at least one perforated deck situated in-line with said upper and lower troughs, and wherein said declumping zone is positioned between said pair of magnetic separators.

25. The apparatus of claim 24 wherein said declumping zone comprises at least a pair of perforated deck elements.

26. The apparatus of claim 25 wherein said pair of perforated deck elements each have a slight angle of inclination with respect to a horizontal plane.

27. The apparatus of claim 26 wherein said angle of inclination is adjustable.

28. The apparatus of claim 22 further including a vibratory sizing screen situated above said lower vibrating trough and beneath a second one of said pair of magnetic separators.

29. The apparatus of claim 22 wherein said trough assembly further includes at least one declumping zone comprising at least one perforated deck situated in-line with said upper and lower troughs, and wherein at least one perforated deck is inclined at an angle to a horizontal plane.

* * * * *